United States Patent
Pank

Patent Number: 5,489,136
Date of Patent: Feb. 6, 1996

[54] METHOD FOR PROVIDING AN ETERNAL, RAIN-TOLERANT SUN SCREEN FOR CONVEX REAR WINDOW OF AUTOMOBILE

[76] Inventor: Michael J. Pank, 57 Dulwich Avenue, Dulwich S.A. 5065, Australia

[21] Appl. No.: 392,351

[22] Filed: Feb. 22, 1995

Related U.S. Application Data

[62] Division of Ser. No. 9,346, Jan. 26, 1993, Pat. No. 5,423,589, which is a continuation of Ser. No. 623,912, Dec. 19, 1990, abandoned.

[51] Int. Cl.⁶ ..................................................... B60J 3/00
[52] U.S. Cl. .................. 296/146.15; 160/370.21
[58] Field of Search ................... 160/370.21, 368.1, 160/354, DIG. 2, 405; 296/95.1, 97.1, 97.7, 97.8, 97.2, 97.3, 146.15

[56] References Cited

U.S. PATENT DOCUMENTS

| | | |
|---|---|---|
| 1,571,019 | 1/1926 | Lucas . |
| 3,749,147 | 7/1973 | Hess et al. . |
| 3,751,100 | 8/1973 | Keyes ..................................... 296/95 C |
| 3,753,458 | 8/1973 | Lazarek ................................. 160/354 |
| 4,025,103 | 5/1977 | Eichstaedt ........................ 160/370.2 X |
| 4,068,428 | 1/1978 | Peterson .............................. 160/354 X |
| 4,100,957 | 7/1978 | Shelton ............................... 160/368.1 |
| 4,249,589 | 2/1981 | Loeb ................................... 160/354 X |
| 4,562,675 | 1/1986 | Baigas et al. ........................ 160/354 X |
| 4,562,676 | 12/1986 | Sarver ............................. 160/370.2 X |
| 4,790,591 | 12/1988 | Miller ................................. 160/370.2 |
| 4,867,222 | 9/1989 | Roman et al. ....................... 160/354 X |
| 4,993,471 | 2/1991 | Golden ............................... 160/370.2 |

FOREIGN PATENT DOCUMENTS

| | | |
|---|---|---|
| 4035 | 10/1968 | Australia . |
| 48457 | 5/1974 | Australia . |
| 53226 | 2/1986 | Australia . |
| 82268 | 9/1988 | Australia . |
| 2477215 | 6/1981 | France ............................... 160/354 |
| 3028474 | 2/1982 | Germany . |
| 879130 | 10/1961 | United Kingdom . |
| 1179748 | 1/1970 | United Kingdom . |
| 1431011 | 4/1976 | United Kingdom .............. 160/354 |
| 2157245 | 10/1985 | United Kingdom . |

*Primary Examiner*—David M. Purol
*Attorney, Agent, or Firm*—Cushman Darby & Cushman

[57] ABSTRACT

An arrangement for providing some protection against sun passing through a rear fixed glass window of a motor vehicle which comprises pliable mesh held against the external face of the convex shape of the glass of the rear window with a hook and loop fastening system extending around the periphery of the mesh and being adhered directly to the glass of the rear window. The mesh is comprised of fibres being substantially fiberglass so as to have similar thermal contraction and expansion characteristics as the glass of the motor vehicle window.

2 Claims, 4 Drawing Sheets

METHOD FOR PROVIDING AN ETERNAL, RAIN-TOLERANT SUN SCREEN FOR CONVEX REAR WINDOW OF AUTOMOBILE

This is a division of application Ser. No. 08/009,346, filed Jan. 26, 1993, now U.S. Pat. No. 5,423,589, which was a continuation of application Ser. No. 07/623,912, filed Dec. 19, 1990 (abandoned).

BACKGROUND OF THE INVENTION

This invention relates to restricting passage of sunlight through a rear window of a motor vehicle.

It is now well known to use substantially rigid louvres which are shaped so as to provide selected covering of the rear window of a motor vehicle, but by reason of their shape, allow for viewing by a driver through the rear window at least with respect to following traffic.

Such devices have a first difficulty in that they are prominent insofar as the styling of the motor vehicle is concerned and that not everyone likes the looks of such devices.

The second problem is that they are bulky after manufacture and are, therefore, relatively expensive to store and to transport pending sale.

Furthermore, they can be difficult to transport subsequent to sale.

It is well known to provide film which can restrict the passage of sunlight through a window by providing a highly reflective external surface or by providing tinting.

Such materials have their place, but provide too much reflective effect if a highly reflective surface is provided on the external window which can, with coincident positions of the sun and the vehicle, cause highly blinding reflection with respect to other drivers in adjacent motor vehicles. Further, the film material has been found to be of relatively limited life and it is therefore expensive from time to time to have to replace the material and in the meantime, when it becomes tattered, it makes the vehicle look poor. Further, such film materials are not removable and replaceable from time to time, so that whereas during some seasonal periods, people wish to have the tinting effect in place it is subsequently not at all easy to remove this and in any event the removal process will normally destroy the material, requiring replacement entirely, at high cost.

SUMMARY OF THE INVENTION

In the broadest concept, it is an object of the present invention to provide for a mesh which can be replaceably located against the outside surface of the glass of the rear window of a motor vehicle.

There are, however, a very large number of immediate problems that arise from this simple proposal.

The first surprising difficulty relates to a difficulty as to what might happen when it rains.

The difficulty here is that with mesh with reasonably fine interstices, the water can have a very significant tendency to stay, by surface tension, across the interstices and between the mesh and the external surface of the glass.

The effect of this has been found in many trials of various arrangements to ensure that it is simply not possible to see anything through the window because of the distortion effect caused by the water held in such an arrangement. Further, this can take considerable time to clear.

A surprising discovery has been, therefore, that if the mesh can be held so as to lie in contact with the external surface of the glass, water, typically from rain, appears to find the attraction between the glass and the individual fibres of mesh more attractive than across the interstices especially where the distance across the interstices is greater than the distance between the individual fibres of the glass of the vehicle window.

The effect, therefore, by achieving this is to provide that the water will clear from across the interstices returning, therefore, rear vision very rapidly after any deluge.

A further discovery is that with this arrangement, one can also use on the external side of the mesh when held against the actual surface of the glass, a windscreen wiper thus significantly improving, once again the vision potential during a deluge situation.

In order to achieve these features, it has been found necessary to ensure that the mesh is secured around its own outer periphery as close as possible onto the actual surface of the glass and that the mesh being pliable, is held under tension across a convex shape only of the external surface of the rear window of a motor vehicle.

The next problem relates to securing such mesh to the rear window of a motor vehicle.

It becomes essential, from time to time, to be able to remove such mesh, both to enable the glass surface to be cleaned, and, of course, to allow for removal when a shade effect is no longer wanted by the owner but also to enable easy installation.

A number of techniques for attachment might, at first sight, appear sensible.

For instance, it is well known to attach mesh for devices such as screen doors where the mesh is intended to limit access of insects.

A typical method for attachment of the mesh is to provide a channel, and to capture an edge of the mesh within the channel shape by a beading.

This technique, however, takes a very large time to install and also could not easily be arranged so that the edge of the mesh could be held using the securement fixing technique close to the surface of the glass.

The channel has a selected depth which is located with a mouth transversely orientated to the planar direction of the mesh being secured and the mesh would, therefore, have to stand out from the glass by this considerable distance.

Apart from this, the look of such a channel and beading fixture system is not good if intended to be located across the rear of a motor vehicle window.

One significant problem that has to be taken into account is the problem that relocation on the rear window of a motor vehicle is subjected to very extreme changes of temperature which will have the result of causing very significant thermal expansion and contraction.

The problem, then, is that if the screen is fitted to be stretched with substantial tension during a hot day, during the night the mesh will contract, but, of course, the glass to which it might be attached will not change it's shape or length to the same extent due to conventional characteristics of glass.

If such contracting then causes the fitting means to loosen, because the screen is located in such a position as to be subject to windage during the motion of the motor vehicle, such loosening of contact can cause the screen to be captured by the wind and rapidly be swept away from the vehicle during motion and could of course, that cause the sreen to be lost.

Such a difficulty is simply not acceptable for a commercially available mesh screen proposal of the type being envisaged. A discovery has been that a method of fastening which meets both the needs of economy, rapidity of location and permanency when in position, can be the use of a material generally known as the trademark "Velcro" which comprises a number of loops on one surface and a number of hook-shaped parts on another.

Using such a hook and hoop type fixing technique, could indeed solve a number of the problems, but it has one major failing, namely, that if indeed engagement between the relative parts is broken by lateral force, engagement does not inherently restore fixing without transverse pressure.

What this would normally mean, therefore, is that if the attachment is loosened because of thermal contraction, attachment would not automatically be restored someone would need to go to back of the car and push the materials together again.

Obviously this leaves the screen subject to being readily ripped off the back. The problem has, to a large extent, been solved by the discovery that there is a mesh-type material which incorporates, as a large proportion of the material, glass fiber. and which, when used in the context of an external screen for an automotive rear window, avoids the problems mentioned above.

The advantages, therefore, are that the glass fibre will broadly have similar thermal expansion and contraction characteristics as the glass of the screen to which it is attached and will therefore maintain relative dimensional stability relative to the glass and therefore can be attached using such a technique which has all the other advantages of the hook-and-loop system.

The invention provides an arrangement providing for some protection against sun passing through a rear fixed-glass window of a motor vehicle, wherein the protection is provided by a pliable mesh held to extend across and against the external face of the glass, where the external face is of convex shape and the mesh is secured by being attached at the perimeter of the mesh and within the perimeter of the frame holding the glass. closely to the glass so as to be constrained so that substantially all of the mesh lies adjoining against the external surface of the glass.

By preference, the pliable mesh is releasably fastened so as to be held substantially against the esternal face of the glass by means of a hook-and-loop fastening tape combination.

By preference, the hook-and-loop fastening tape combination is such that the tapes providing such fastening extend around the entire other exposed periphery of the rear fixed-glass window of the motor vehicle and are attached directly to the external surface of the glass providing the window.

By preference, the loop tape portion of the hook-and-loop fastening system is attached directly to the glass of the rear fixed-glass window of the motor vehicle by means of a pressure-sensitive adhesive.

By preference, the pliable mesh material is comprised of a mesh woven from strands of plastics material-coated fiberglass.

BRIEF DESCRIPTION OF THE DRAWINGS

A better understanding of the present invention will be achieved by reference to a preferred embomdiment which is described here in below with reference to the accompanying drawings, in which.

DETAILED DESCRIPTION

Figure 1:
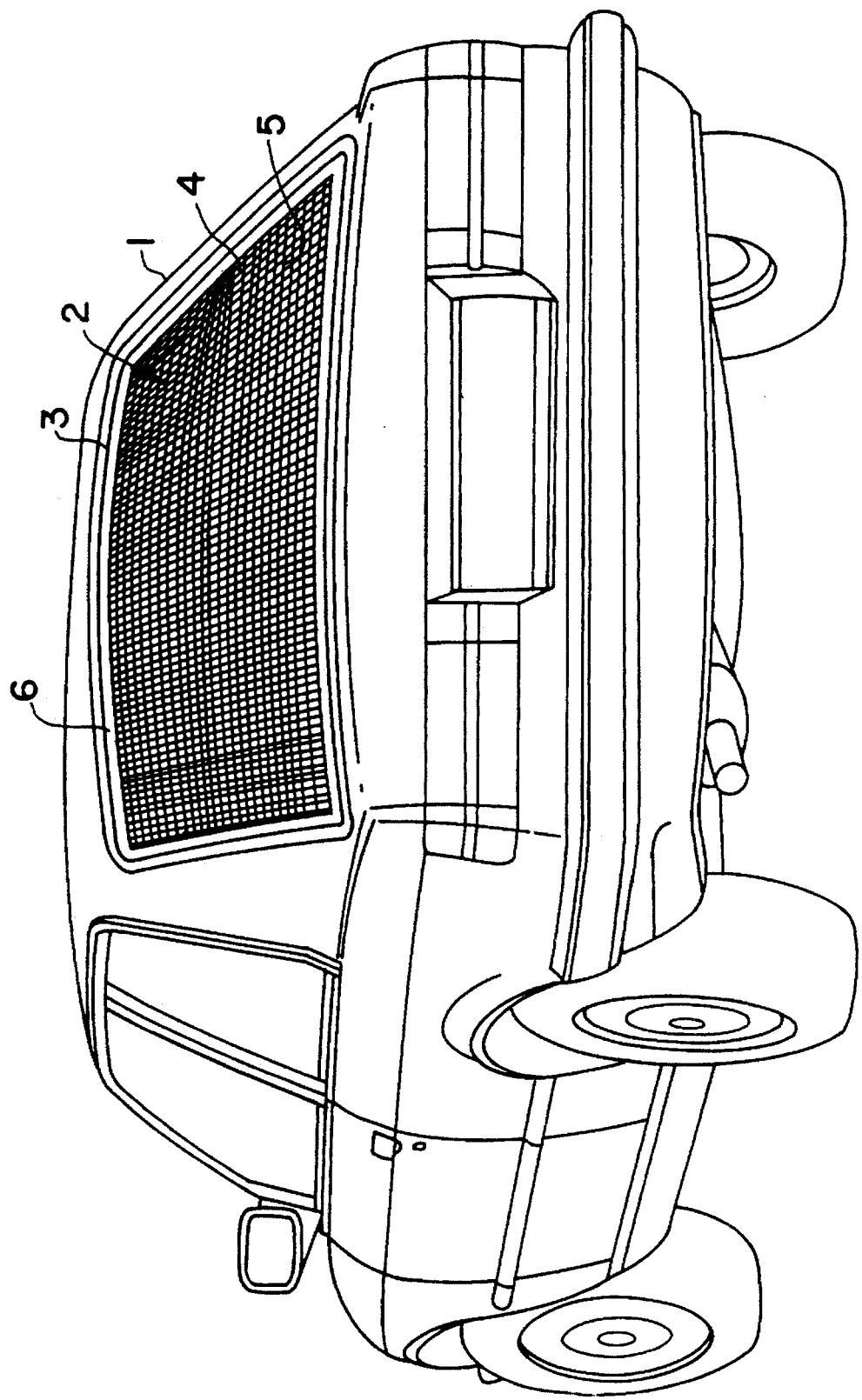
FIG. 1 is the rear perspective: view of a motor vehicle, showing the location of a screen provided in accordance with principles of the present invention, and shown located in position across the fixed rear window of the motor vehicle.

Now refering to the drawings in detail, there is shown a vehicle 1 which has a rear window 2 which has fixed glass enclosed by a peripheral rubber sealing mounting strip 3.

Located so as to extend across the convex external, rear face of the glass 4 is a pliable mesh 5 which is secured by being attached at the outer perimeter 6 thereof, closely to the external, rear face of the glass 4 and of course by being tightly stretched across the convex shape of the glass there is achieved an engaging relationship between surface of the glass and the mesh 5.

Figure 2:
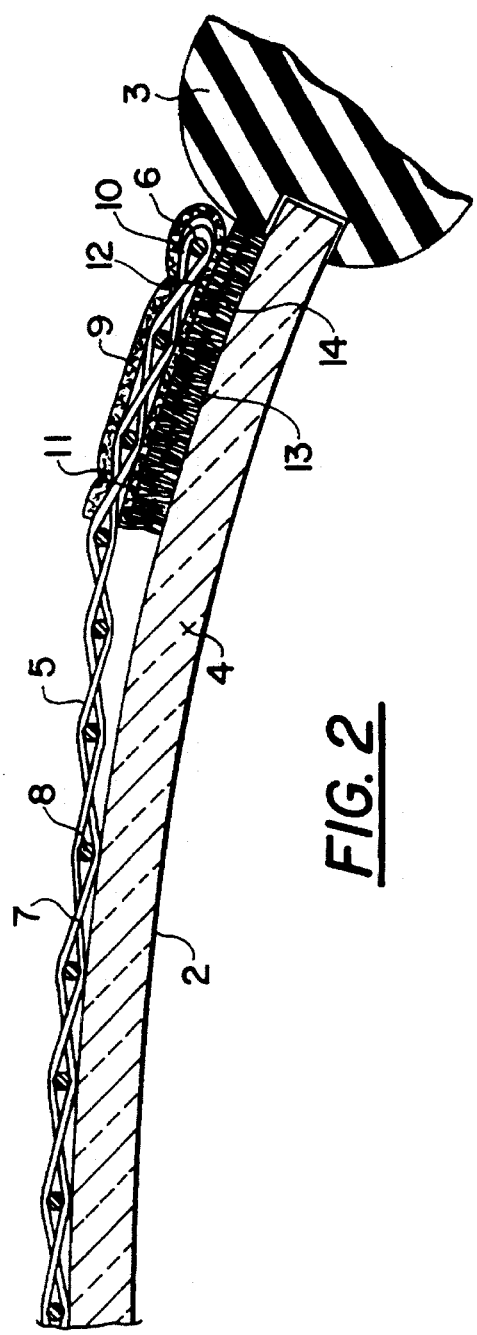
FIG. 2 is and enlarged fragmentary horizontal transverse cross-sectional view shown in somewhat schematic form illustrating the way in which the mesh of the screen of FIG. 1, is attached at the perimeter of the convex surface of the glass at the rear window of the motor vehicle and also the way in which the mesh extends from the fixing to lie adjoining the surface of the glass.

The technique of fitting the mesh is better seen by reference to FIG. 2 in which the pliable mesh 5 is seen to comprise a plurality of interwoven strands in which there is a weft 7 and warp 8.

Figure 3:
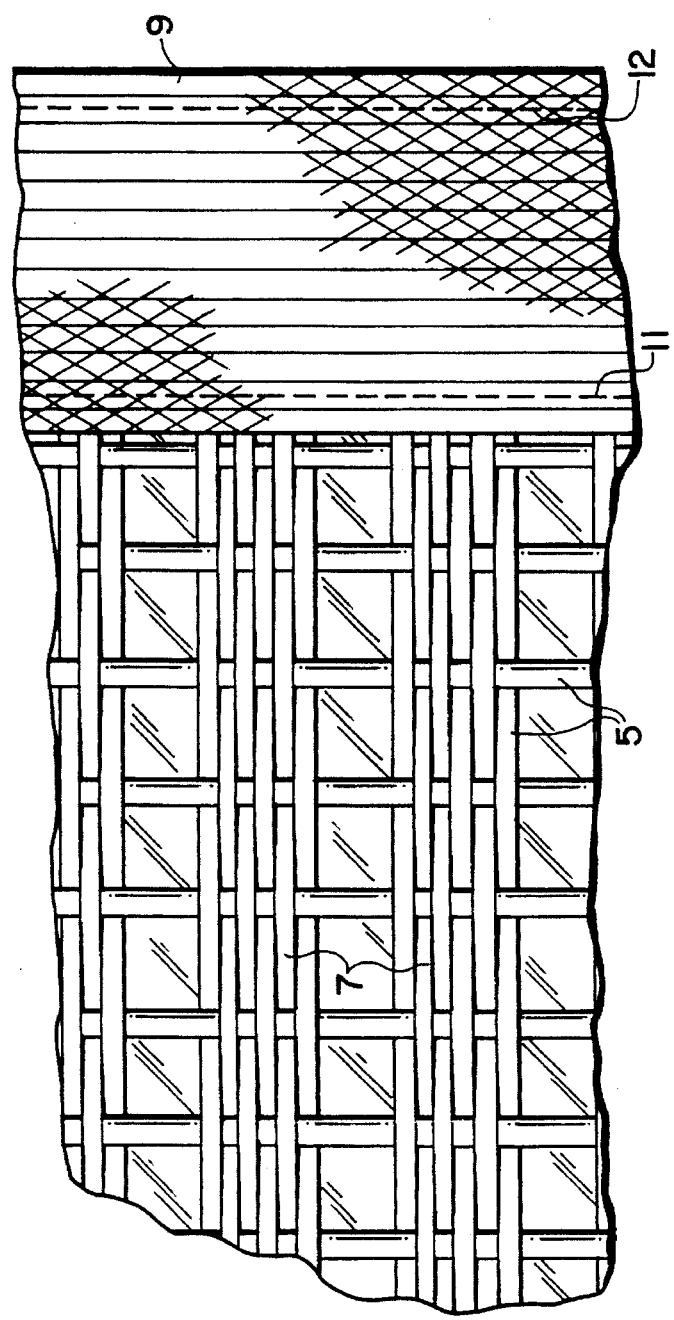
FIG. 3 is a plan view of a portion of the mesh providing the shade screen, together with fixing means located along the perimeter of the mesh.

The particular woven arrangement includes a bunched group of weft threads 7. as shown in particular in FIG. 3, and in which there are shown bunches of six wefts together, then leaving a gap before the next bunch of six weft threads.

In this embodiment each of threads is comprises of vinyl-encapsulated fibre glass in which the glass fibres broadly continously, extend the length of each thread and the warp has diameter of 0.2 millimeters and the weft has a diamter of 0.3 millimeters.

As particularly shown in FIG. 2, the arrangement for securing the mesh to the convex surface of the glass 4 includes a tape 9 which is wrapped around the perimeter edge 10 of the mesh 5 and sewn at locations 11 and 12.

Across the bottom of the tape 9 there is adhered by means of a self-adhesive material, a hook-tape 13, and below this and adhered directly to the surface of the glass 4, a loop tape 14.

The hook-tape 13 and loop-tape 14 provide together a fastening method that is well-known under the trademark "Velcro", and it is this type of fastening that this embodiment is utilizes.

One particular problem relates to locating the hook-and-loop tape parts so as to provide means to retain adequate tension across the full perimeter of the mesh.

Figure 5:
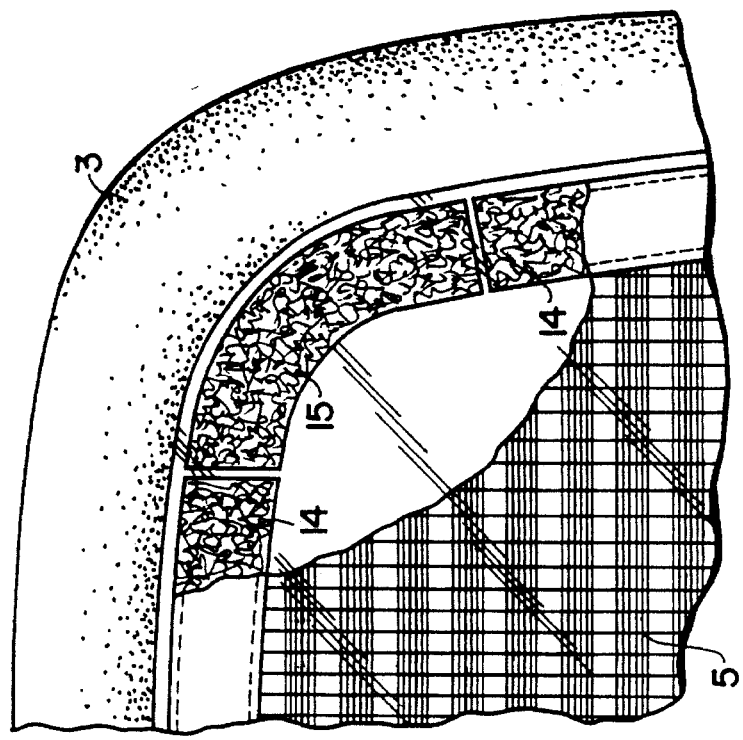
FIG. 5 shows a further arrangement showing a rounded corner as applicable to the top left or right-hand part of the window, as shwon in FIG. 1.
Figure 4:
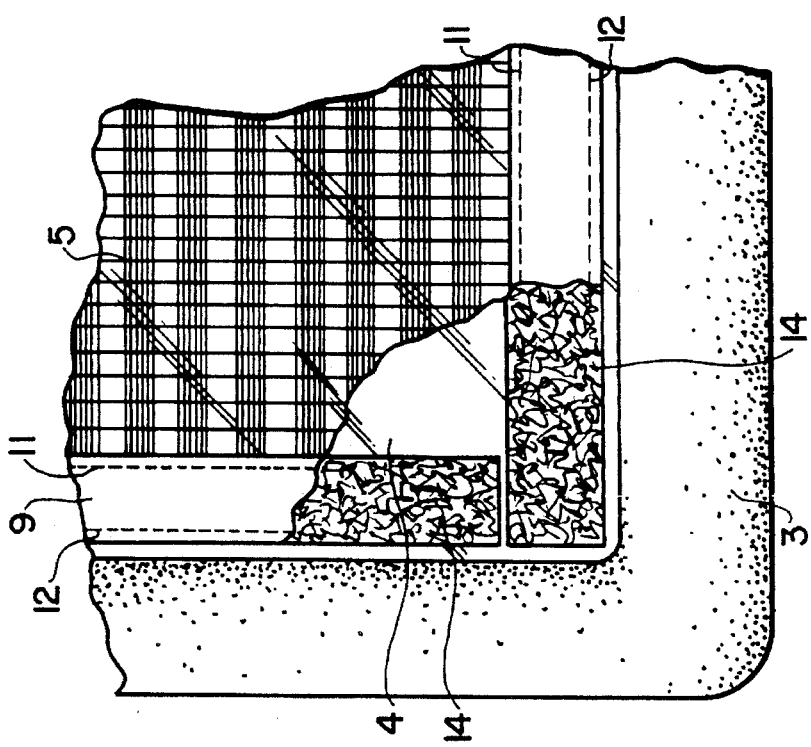
FIG. 4 shows in plan view the arrangement within a sharp corner of the rear window of a motor vehicle.
Figure 6:
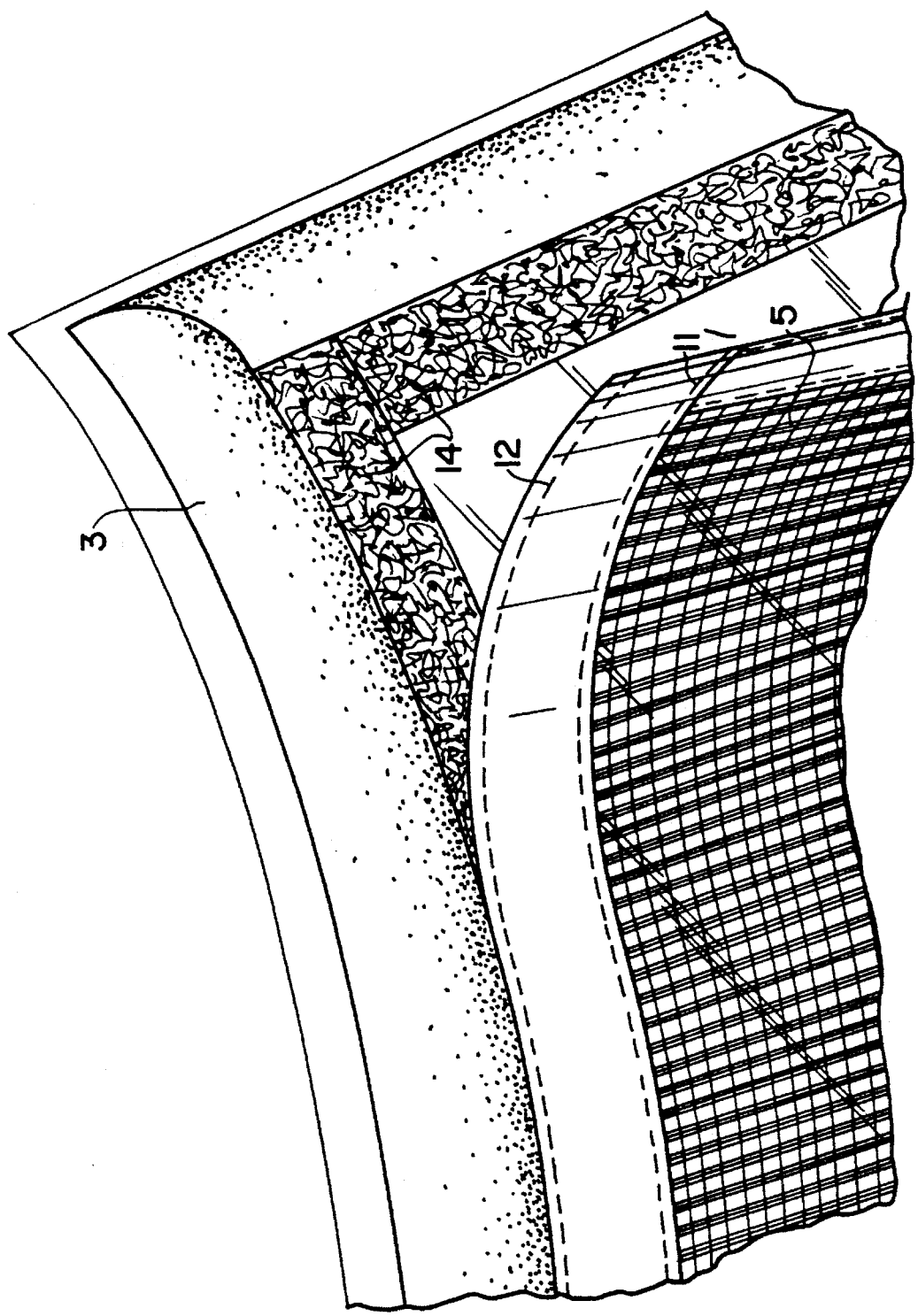
FIG. 6 shows a perspective view of the detail as in FIG. 4, with part of the pliable mesh pulled away.

To this extent, therefore, it has been found important to provide that the loop tape 14 includes, particularly at the arcuate corners, such as the one which is shown in FIG. 5, a portion 15 which is cut in such a way that the loop direction and the corresponding hook direction on the perimeter of the mesh will be such as to provide maximum adhesion against tension from the general body of the mesh.

One of the very good reasons for this is that the mesh material will not follow compound curves on a convex shape glass unless, first of all, all of the hook-and-loop tapes are holding well and accordingly can hold all of the perimeter under tension.

It is an important feature, therefore, that the perimeter fixing is substantially around all of the perimeter of the mesh and in this embodiment is indeed fully around the perimeter and the orientation of the hook-and-loop tape at all times is such as to provide maximum reaction against release from such tension.

When the mesh is placed in position, great care must be taken to pull the mesh tightly and continually pull the mesh tightly as it is fitted.

Pulling the mesh lightly as it is fitted will provide an appearance which is almost skin-like against the external surface of the rear of the glass of the motor vehicle.

The hook-loop material has been selected to meet the Military Specification F21840 Type 2 Class 1.

The mesh material has been selected to withstand a range of temperatures between minus twenty-nine degrees Centigrade and ninety-three degrees Centigrade.

In trials conducted, the mesh with the arrangement described was located on the rear of a motor vehicle and fitted so as to effect a sustained tension over all of the mesh while the temperature of the air within the vicinity was approximately five degrees Centigrade.

Subsequently, the motor vehicle was moved so that the temperature rose to forty-five degrees Centigrade whereupon there was no observed slackness or loosening of the fixing of the Velcro-type hook-and-loop system.

Testing the deluge visibility with the same screen installed, water was poured onto the screen so that there was ample excess running off the screen while the vehicle was still.

As this would be the worst case, it was noticed that most of the interstices were cleared of water within ten minutes.

When the mesh was pulled away from the glass, there appeared to be significant water still remaining on the glass but this water did not appear visible when the mesh was returned, under tension, and held tightly against the surface of the glass. It appeared, therefore, that the water was being held under surface tension between the individual threads, but not acting to extend across the interstices and therefore to distort or block vision.

I claim:

1. A method for providing a rain-tolerant sun screen for an outer surface of an automotive rear fixed-glass window which is externally convex both left-to-right and top to bottom, and which is perimetrically surrounded by a non-glass body portion of an automotive vehicle, said method comprising:

(a) adhering to said outer surface of said window adjacent said non-glass body portion throughout substantially all of the outer perimeter of said window, one tape member of a two-member hook tape member and loop tape member set;

(b) providing a pliable mesh of screen material having an outer perimeter and a network of openings having given lateral dimensions in a plane containing said pliable mesh;

(c) securing to said pliable mesh about substantially all of said outer perimeter thereof, the other tape member of a two-member hook tape member and loop tape member set;

(d) biaxially stretching said pliable mesh lengthwise and widthwise and engaging together said hook tape member and said loop tape member so that said pliable mesh engages said outer surface in a biaxially tensioned condition, said pliable mesh being held so closely against said outer surface throughout substantially all of the length and width of said pliable mesh, that the distance between said pliable mesh and said outer surface is less than said lateral dimensions of said openings through said mesh.

2. The method of claim 1, wherein:

in step (a), said one tape member is adhered to said outer surface using a pressure sensitive adhesive;

in step (c), a sewable tape is sewn to the pliable mesh along said outer perimeter, and said other tape member is adhered to said sewable tape using a pressure sensitive adhesive;

said screen material is provided as a woven mesh comprising warp fibers having a 0.2 mm diameter and weft fibers having a 0.3 mm diameter;

said screen material is made of vinyl plastic material-coated fiber glass; and in step (d), said hook and loop tape members are oriented relative to one another so as to maximize holding power provided by said hook and loop tape members as a result of conducting step (d).

* * * * *

UNITED STATES PATENT AND TRADEMARK OFFICE
CERTIFICATE OF CORRECTION

PATENT NO.    : 5,489,136

DATED         : February 6, 1996

INVENTOR(S)   : PANK, Michael J.

It is certified that error appears in the above-identified patent and that said Letters Patent is hereby corrected as shown below:

On the title page:

Item [62], after "abandoned", insert --, filed as PCT/AU88/00136, May 9, 1988--.

Item [54], and column 1, line 1, change "ETERNAL" to --EXTERNAL--

Signed and Sealed this

Eighteenth Day of June, 1996

Attest:

BRUCE LEHMAN

Attesting Officer

Commissioner of Patents and Trademarks